United States Patent Office 3,775,319
Patented Nov. 27, 1973

3,775,319
OIL COMPOSITION WITH ANTI-CORROSION
PROPERTIES
David A. Hartman, Trenton, N.J., assignor to
Cities Service Oil Company
No Drawing. Filed Dec. 30, 1969, Ser. No. 889,345
Int. Cl. C10m 1/32, 1/40
U.S. Cl. 252—33.4    12 Claims

ABSTRACT OF THE DISCLOSURE

A lubricating composition consisting of a major proportion of hydrocarbon oil and minor proportions each of a metal sulfonate, wherein the metal is selected from Group IIb and IVa of the Periodic Table, and a non-ionic surfactant selected from the group consisting of polyvinyl alcohols and polyvinyl pyrrolidone.

BACKGROUND OF THE INVENTION

The prevention of metal corrosion is an ever present problem, and to combat this problem, a wide variety of corrosion preventive formulations have been developed. A well known class of anti-corrosion additives is the sulfonate type of compound. These are barium, calcuim and sodium salts of organic sulfonates wherein the organic moiety is a hydrocarbyl group such as alkyl, aryl, alkaryl aralkyl or naphthenyl. Since these additives are generally employed in a hydrocarbon base, such as a hydrocarbon oil, the hydrocarbyl moiety is generally of such a nature that the sulfonate is at least slightly soluble in the hydrocarbon base oil.

In applications where the metal part or machine is subjected to exposure to salt water such as in marine applications, the anti-corrosion additive and the hydrocarbon base in which it is employed are subjected to a very severe test. If there is exposure to salt water, not only must the additive have good intrinsic anti-corrosion properties, but it must impart to the hydrocarbon base oil a high degree of film tenacity so that the oil composition adheres to the metal part or machine to thereby protect it from corrosion by the salt water.

Oil compositions containing only the sulfonate anti-corrosion additives of the prior art, i.e., the barium, calcium and sodium salts of the organic sulfonate, while having adequate anti-corrosion properties to pass the ASTM D 665–B rust test, have insufficient film tenacity to pass the 24 hour salt water immersion test. This deficiency is remedied by the use of certain polyoxyethylene ethers as synergists in conjunction with the prior art sulfonates. Thus oil compositions, containing a polyoxyethylene ether plus a barium, calcium or sodium salt of an organic sulfonate not only have enhanced anti-corrosion properties, but the film tenacity thereof is improved sufficiently to pass the 24 hour salt water immersion test.

However, oil compositions containing a mixture of a polyoxyethylene ether and a barium, calcium or sodium salt of an organic sulfonate have a serious defect. The oil composition almost always has a tendency to form emulsions with water. Accordingly, in situations involving exposure to salt water, the extremely corrosive salt water is homogeneously dispersed throughout the oil phase where it can come into intimate contact with the metal part or machine which is sought to be protected.

SUMMARY OF THE INVENTION

It is an object of this invention to provide anti-corrosion additives suitable for incorporation in hydrocarbon oils.

It is another object of this invention to provide oil compositions having anti-corrosion properties and good film tenacity.

Yet another object of this invention is to provide oil compositions having anti-corrosion properties and good film tenacity and which do not tend to form emulsions with water.

Still another object of this invention is to provide turbine and hydraulic oil compositions having anti-corrosion properties and good film tenacity and which do not tend to form emulsions with water.

The foregoing objects are attained in accordance with this invention. Broadly, this invention comprises a hydrocarbon oil composition containing:

(a) a major proportion of a hydrocarbon oil; and
(b) a minor proportion of anti-corrosion additive comprising:
    (1) a hydrocarbyl sulfonate salt of a metal selected from Groups IIb and IVa of the Periodic Table; and
    (2) a non-ionic surfactant;

and an anti-corrosion additive composition for hydrocarbon oils comprising:
(a) a hydrocarbyl sulfonate salt of a metal selected from Groups IIb and IVa of the Periodic Table; and
(b) a non-ionic surfactant.

Hydrocarbon oil compositions containing the additives of this invention exhibit remarkable anti-corrosion properties, excellent film tenacity, and little or no tendency to form emulsions with water.

DESCRIPTION OF THE PREFERRED EMBODIMENTS

There are no restrictions on the hydrocarbon oils that are useful in the practice of this invention. However, it is anticipated that oils which are to be used in a corrosive environment are particularly suitable to have incorporated therein the anti-corrosion additives of this invention. Especially suitable are turbine and hydraulic oils, particularly those which are used in a salt water environment such as in naval applications.

The metal sulfonate component of the anti-corrosion additive is the hydrocarbyl sulfonate of a metal selected from Groups IIb and IVa of the Periodic Table whose principal requirement, aside from its anti-corrosion properties, is that it be at least slightly soluble, or capable of being rendered at least slightly soluble, in the hydrocarbon oil. All the metals of Group IIb of the Periodic Table, i.e., zinc, cadmium and mercury, and all the metals of Group IVa of the Periodic Table, i.e., germanium, tin and lead, form hydrocarbyl sulfonates that are useful in the practice of this invention. However, I have found zinc and lead sulfonates to be preferred. The metal sulfonates may be basic metal sulfonates wherein at least one of the valences of the metal is satisfied by a hydroxyl group. Alternatively, all of the valences of the metal may be satisfied by hydrocarbyl sulfonate groups. The lead, tin or germanium may have a valence of either two or four. The hydrocarbyl moiety of the metal sulfonate may therefore be saturated or unsaturated alkyl, aryl, alkaryl, aralkyl, or naphthenyl. In order that the metal sulfonate may be at least slightly soluble in the hydrocarbon oil, the hydrocarbyl portion of each hydrocarbyl sulfonate group should contain at least about eighteen carbons. A typical metal salt of a hydrocarbyl sulfonate will generally contain about 18 to about 65 carbons per hydrocarbyl sulfonate group with about 22 to about 60 carbons being fairly common. If the metal salt of the hydrocarbyl sulfonate is not sufficiently soluble in the hydrocarbon oil, its solubility may be enhanced by adding to the oil composition a good solvent for the metal sulfonate which is also miscible with the oil. Examples of metal salts of hydrocarbyl sulfonates which are useful in the practice of this invention are lead di(nonylnaphthalene sulfonate), monobasic lead nonylnaphthalene sulfonate, dibasic lead di(nonylnaphthalene sulfonate), lead di(octadecylbenzene sulfonate), lead tetra(octadecylbenzene sulfonate), lead di(eicosyl sulfonate), monobasic lead eicosyl sulfonate, zinc di(nonylnaphthalene sulfonate), monobasic zinc nonylnaphthalene sulfonate, zinc di(octadecylbenzene sulfonate), monobasic zinc eicosyl sulfonate, zinc di(eicosyl sulfonate), tin di(eicosyl sulfonate), monobasic tin tri-(nonylnaphthalene sulfonate), cadmium di(octadecylbenzene sulfonate), monobasic cadmium eicosyl sulfonate, mercury di(octadecylbenzene sulfonate), and monobasic mercury nonylnaphthalene sulfonate.

The non-ionic surfactant component of the anti-corrosion additive of this invention is believed to act as a synergistic agent to enhance the anticorrosion and film tenacity properties of the metal salt of the hydrocarbyl sulfonate. Non-ionic surfactants in general are operable in this invention with the stipulation that they be at least slightly soluble, or capable of being rendered at least slightly soluble, in the hydrocarbon oil. As is the case with the metal salt of the hydrocarbyl sulfonate, if the non-ionic surfactant is not sufficiently soluble in the hydrocarbon oil, its solubility may be enhanced by adding to the oil composition a good solvent for the non-ionic surfactant which is also miscible with the oil.

Examples of non-ionic surfactants that are suitable for the practice of this invention are polyvinyl alcohols, polyvinyl pyrrolidone, and carbohydrate esters. Specific examples of carbohydrate esters are sorbitan monooleate and polyethoxylated sorbitan monooleate. A particularly desirable class of non-ionic surfactants are mono (alkylphenyl) ethers of alkylene glycols and of polyalkylene glycols having the formula:

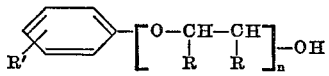

wherein R' is an alkyl group, preferably branched and saturated, of 1 to about 20 carbons and preferably about 6 to about 10 carbons; R is hydrogen or an alkyl group of 1 to 3 carbons; and $n$ is an integer of from 1 to about 10. The alkyl group on the benzene ring may be ortho or meta, but the para position is preferred. The ratio of total carbons in the oxyalkylene groups to the carbons in the alkyl group on the benzene ring is from about 1 to 4 to about 3 to 1 with a ratio of about 1 to 1 being preferred. An especially preferred example of this type of non-ionic surfactant is the mono (p-isooctylphenyl) ether of pentaethylene glycol

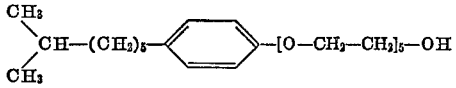

The hydrocarbon oil compositions of this invention comprise a major proportion of hydrocarbon oil and minor proportions of the metal salt of the hydrocarbyl sulfonate and the non-ionic surfactant. In addition, conventional additives such as antioxidants, antiwear agents, detergents, antifoaming agents, viscosity index improvers, and pour point depressants may be present. The amount of the metal salt of the hydrocarbyl sulfonate in the hydrocarbon oil composition is about 0.5 to about 5.0%, and preferably about 1.0 to about 2.0%, by weight of the composition. The amount of non-ionic surfactant present in the hydrocarbon oil composition is about 0.05 to about 1.0%, and preferably about 0.08 to about 0.20%, by weight of the composition.

As stated above, conventional additives may also be present in the hydrocarbon oil compositions of this invention. They are present in amounts that are well known in the art. Specific examples of conventional additives are the following:

Antioxidant—Ditertiarybutylparacresol, ocylated diphenylamine, zincdibutyldithiocarbamates Antiwear—Zincdialkyldithiophosphate, tricresyl phosphate Detergent—Barium sulfonates, barium phosphonates, barium phenates Antifoams—Silicones VI Improvers—Polymethacrylates, polybutenes Pour point depressants—Polymethacrylates, phenol tetra wax condensation product.

The anti-corrosion additive composition to be incorporated in the hydrocarbon oil may be comprised of the metal salt of the hydrocarbyl sulfonate and the non-ionic surfactant in a wide range of ratios. However, it is preferred that the ratio by weight of the metal salt of the hydrocarbyl sulfonate to the non-ionic surfactant be from about 0.5:1 to about 100:1.

As stated earlier, oil compositions containing the prior art anti-corrosion additives, i.e., barium, calcium and sodium phenates and salts of hydrocarbyl sulfonates plus a polyoxyethylene ether, have the serious disadvantage of forming emulsions with water. Surprisingly, I have found that hydrocarbon oil compositions of my invention, i.e., hydrocarbon oil compositions containing a hydrocarbyl sulfonate of a metal selected from Groups IIb and IVa of the Periodic Table plus a non-ionic surfactant, can tolerate the presence of barium, calcium and sodium phenates and salts of hydrocarbyl sulfonates without acquiring a tendency to form emulsions with water. The tolerance of my hydrocarbon oil compositions toward the inclusion of barium, calcium and sodium phenates and salts of hydrocarbyl sulfonates persists even when the non-ionic surfactant in said composition is a polyoxyethylene ether. Thus if the hydrocarbon oil composition of my invention contains at least about 0.5 weight percent of a hydrocarbyl sulfonate of a metal selected from Groups IIb and IVa of the Periodic Table, up to three times this amount of barium, calcium and sodium phenates and salts of hydrocarbyl sulfonates may also be present in the composition without introducing a tendency to form emulsions with water.

The efficacy of hydrocarbon oil compositions of my invention was measured by subjecting them to the ASTM D 1401 emulsion test and to the ASTM D 665–B corrosion test as well as the film tenacity B option of the corrosion test. These tests are carried out as follows:

Emulsion Test (ASTM D 1401)

A mixture of 40 ml. of distilled water and 40 ml. of the oil composition is shaken and the emulsified mixture placed in a graduate cylinder. The emulsified mixture is checked at 5 minute intervals; the time in minutes for the emulsion to break is recorded and the volumes of water, oil composition and interfacial emulsion at this time are noted. The maximum volume of interfacial emulsion which is acceptable is 3 ml. If the emulsion does not break within 60 minutes, the oil composition is considered to have failed the test.

Corrosion Test (ASTM D 665-B)

The oil composition is floated on top of synthetic sea water in a beaker. A metal test piece is suspended in the oil layer and the oil/water mixture is stirred at 140° F. for 24 hours. At the end of this time, the percent of the surface of the metal test piece that is covered by rust is determined. If there is any rust at all, the oil composition is considered to have failed the test.

Film Tenacity B Test

If the oil composition passes the above corrosion test, i.e., complete absence of rust on the metal test piece, the Film Tenacity B Test is run. The beaker of oil/synthetic seat water is removed and the metal test piece is allowed to drain. It is then immersed in 300 ml. of synthetic sea water in a clean beaker and the water is stirred at 140° F. for 24 hours. At the end of this time, the percent of the surface that is covered by rust is determined.

The following specific examples will serve to further illustrate my invention.

EXAMPLE I

A series of oil compositions containing various metal salts of hydrocarbyl sulfonates, both with and without a non-ionic surfactant, is prepared and subjected to the emulsion, corrosion and film tenacity tests described above. The compositions of the oil compositions and the results of the tests are shown in Table I.

TABLE I

| Composition, weight percent | 1 | 2 | 3 | 4 | 5 |
|---|---|---|---|---|---|
| 200 Neutral Oil | 98.0 | 97.9 | 98.0 | 97.9 | 98.1 |
| Na Sul LS | 2.0 | 2.0 | | | |
| Na Sul ZS | | | 2.0 | 2.0 | |
| Lubrizol 1203 | | | | | 1.8 |
| Plexol 305 | | 0.1 | | 0.1 | 0.1 |
| Test results ASTM D 1401 emulsion test: | | | | | |
| Oil, ml | 40 | 40 | 40 | 40 | 36 |
| Water, ml | 38 | 40 | 38 | 37 | 34 |
| Emulsion, ml | 2 | 0 | 2 | 3 | 10 |
| Time, min | 15 | 25 | 5 | 10 | 60 |
| ASTM D 665-B corrosion test | 5% rust | No rust | 30% rust | No rust | No rust |
| Film tenacity B test | | do | | do | Do |

NOTE.—Na Sul LS=50% lead di (nonylnaphthalene sulfonate) in mineral oil, Na Sul ZS=50% zinc di (nonylnaphthalene sulfonate) in mineral oil, Lubrizol 1203=A mixture of basic and neutral barium sulfonates, calcium sulfonates, calcium alkylphenates and an anti-scuff agent manufactured by the Lubrizol Corp., Plexol 305=the mono (p-isooctylphenyl) ether of pentaethylene glycol.

The results show that the oil compositions containing lead sulfonate alone (1) and zinc sulfonate alone (3) fail the corrosion test. The compositions containing lead sulfonate plus a non-ionic surfactant (2) and zinc sulfonate plus a non-ionic surfactant (4) pass the corrosion test and the film tenacity test and, in addition, neither composition forms an emulsion with water. In contrast, the composition containing the mixture of barium sulfonates, calcium sulfonates and calcium phenates plus a non-ionic surfactant (5) passes the corrosion test and the film tenacity test, but it fails the emulsion test.

EXAMPLE II

A series of oil compositions containing a lead salt of a hydrocarbyl sulfonate plus various non-ionic surfactants is prepared and tested as in Example I. The compositions of the oil compositions and the results of the tests are given in Table II.

TABLE II

| Composition, weight percent | 1 | 2 | 3 |
|---|---|---|---|
| 200 neutral oil | 97.9 | 97.9 | 97.9 |
| Na Sul LS | 2.0 | 2.0 | 2.0 |
| Plexol 305 | 0.1 | | |
| Polyethoxylated sorbitan monooleate | | 0.1 | |
| Sorbitan monooleate | | | 0.1 |
| Test results ASTM D 1401 emulsion test: | | | |
| Oil, ml | 40 | 40 | 40 |
| Water, ml | 38 | 37 | 38 |
| Emulsion, ml | 2 | 3 | 2 |
| Time, min | 15 | 5 | 15 |
| ASTM D 665-B corrosion test | No rust | No rust | No rust |
| Film tenacity B test | do | do | Do |

The results shown in the table illustrate that each of the non-ionic surfactants, when incorporated in oil in conjunction with the lead salt of a hydrocarbyl sulfonate, produces oil compositions which pass the corrosion test and the film tenacity test and which do not form emulsions with water.

EXAMPLE III

A series of oil compositions is prepared containing various metal salts of hydrocarbyl sulfonates plus a non-ionic surfactant, and each composition is tested as in Example I. The compositions of the oil compositions and the results of the tests are given in Table III.

TABLE III

| Composition, weight percent | 1 | 2 | 3 | 4 | 5 | 6 | 7 | 8 |
|---|---|---|---|---|---|---|---|---|
| 200 neutral oil | 98.9 | 98.9 | 98.9 | 98.9 | 98.9 | 98.9 | 98.9 | 98.9 |
| Plexol 305 | 0.1 | 0.1 | 0.1 | 0.1 | 0.1 | 0.1 | 0.1 | 0.1 |
| Bryton hybase barium sulfonate [1] | 1.0 | | | | | | | |
| Bryton hybase magnesium sulfonate [2] | | 1.0 | | | | | | |
| Calcium petronate 300 [3] | | | 1.0 | | | | | |
| Petronate L [4] | | | | 1.0 | | | | |
| Petronate CR [5] | | | | | 1.0 | | | |
| Petronate HL [6] | | | | | | 1.0 | | |
| Lubrizol 1203 | | | | | | | 1.0 | |
| Na Sul LS | | | | | | | | 1.0 |
| Test results ASTM D 1401 emulsion test: | | | | | | | | |
| Oil, ml | 37 | 38 | 38 | 5 | 0 | 0 | 38 | 40 |
| Water, ml | 40 | 39 | 40 | 36 | 34 | 0 | 35 | 39 |
| Emulsion, ml | 3 | 3 | 2 | 39 | 46 | 80 | 7 | 1 |
| Time, min | 30 | 40 | 10 | 60 | 60 | 60 | 60 | 20 |
| ASTM D 665-B corrosion test | No rust | No rust | No rust | 35% rust | No rust | 70% rust | No rust | No rust |
| Film tenacity B test | 30% rust | 35% rust | 90% rust | | 1% rust | | do | Do |

[1] 47% solution of basic barium sulfonate with a mol. wt. of 1,030 manufactured by Bryton Chemical Co.
[2] 47% solution of basic magnesium sulfonate with a mol. wt. of 920 manufactured by Bryton Chemical Co.
[3] Basic calcium sulfonate manufactured by Sonneborn Chemical Co.
[4] 60% solution of sodium sulfonate with a mol. wt. of 415-430 manufactured by Sonneborn Chemical Co.
[5] 60% solution of sodium sulfonate with a mol. wt. of 490-510 manufactured by Sonneborn Chemical Co.
[6] 60% solution of sodium sulfonate with a mol. wt. of 440-470 manufactured by Sonneborn Chemical Co.

The data in Table III show that the compositions containing the basic barium sulfonate, the basic magnesium sulfonate, the basic calcium sulfonate and the sodium sulfonates all fail either the corrosion test or the film tenacity test. The compositions containing the sodium sulfonates also fail the emulsion test. The composition containing the mixture of barium sulfonates, calcium sulfonates and calcium alkylphenates plus an anti-scuff agent (7) passes the corrosion and tenacity tests but fail the emulsion test. Only the oil composition containing the additive of the instant invention (8) passes all three tests.

EXAMPLE IV

A number of oil compositions is prepared employing as the sulfonate salt lead di (nonylnaphthalene sulfonate); the mixture of barium sulfonates, calcium sulfonates and calcium alkylphenates plus anti-scuff agent of the prior art; or mixtures thereof. A non-ionic surfactant is present in each composition. Each oil composition is tested as in Example I. The compositions of the oil compositions and the results of the tests are shown in Table IV.

TABLE IV

| Composition, weight percent | 1 | 2 | 3 | 4 | 5 |
|---|---|---|---|---|---|
| High viscosity index neutral oil | 97.9 | 97.9 | 97.9 | 97.9 | 97.9 |
| Na Sul LS | 2.0 | 1.5 | 1.0 | 0.5 | |
| Lubrizol 1203 | | 0.5 | 1.0 | 1.5 | 2.0 |
| Plexol 305 | 0.1 | 0.1 | 0.1 | 0.1 | 0.1 |
| Test results ASTM D 1401 emulsion test: | | | | | |
| Oil, ml | 40 | 39 | 39 | 39 | 28 |
| Water, ml | 40 | 39 | 39 | 38 | 32 |
| Emulsion, ml | 0 | 2 | 2 | 3 | 20 |
| Time, min | 25 | 15 | 10 | 60 | 60 |
| ASTM D 665–B corrosion test | (¹) | (¹) | (¹) | (¹) | (¹) |
| Film tenacity B test | (¹) | (¹) | (¹) | (¹) | (¹) |

¹ No rust.

The data show that oil compositions containing a nonionic surfactant and at least about 0.5% weight percent of a lead salt of a hydrocarbyl sulfonate can tolerate up to about three times the amount of said lead salt of a hydrocarbyl sulfonate of the prior art barium and calcium sulfonates and phenates without forming emulsions with water.

While various specific embodiments of the invention have been illustrated and described, many modifications can be made without departing from this invention, and all such changes are intended to be included within the scope of the claims.

I claim:
1. A hydrocarbon oil composition comprising:
   (a) a major proportion of a hydrocarbon oil; and
   (b) a minor proportion of an anti-corrosion additive consisting essentially of:
      (1) a hydrocarbyl sulfonate salt of a metal selected from Groups IIb and IVa of the Periodic Table; and
      (2) a non-ionic surfactant selected from the group consisting of polyvinyl alcohols and polyvinyl pyrrolidone, wherein the weight ratio of the sulfonate salt to the non-ionic surfactant is from about 0.5:1 to about 100:1.
2. The composition of claim 1 wherein the metal salt of the hydrocarbyl sulfonate is selected from the group consisting of basic lead salts of hydrocarbyl sulfonates, basic zinc salts of hydrocarbyl sulfonates, lead salts of hydrocarbyl sulfonates wherein all of the valences of the lead are satisfied by hydrocarbyl sulfonate groups, zinc salts of hydrocarbyl sulfonates wherein both valences of the zinc are satisfied by hydrocarbyl sulfonate groups, and mixtures thereof.
3. The composition of claim 2 wherein the concentration of the metal salt of the hydrocarbyl sulfonate is about 0.5% to about 5.0% by weight of said composition and the concentration of the non-ionic surfactant is about 0.05% to about 1.0% by weight of said composition.
4. The composition of claim 3 wherein the metal salt of the hydrocarbyl sulfonate contains about 18 to about 65 carbons per hydrocarbyl sulfonate group.
5. The composition of claim 3 wherein the metal salt of the hydrocarbyl sulfonate is selected from the group consisting of lead di (nonylnaphthalene sulfonate), monobasic lead nonylnaphthalene sulfonate, monobasic zinc nonylnaphthalene sulfonate, zinc di (nonylnaphthalene sulfonate), lead di (octadecylbenzene sulfonate), zinc di (octadecylbenzene sulfonate), lead di (eicosyl sulfonate) and zinc di (eicosyl sulfonate).
6. The composition of claim 3 wherein the hydrocarbon oil is selected from the group consisting of turbine oils and hydraulic oils.
7. The composition of claim 2 wherein the concentration of the metal salt of the hydrocarbyl sulfonate is about 1.0% to about 2.0% by weight of said composition and the concentration of the non-ionic surfactant is about 0.08% to about 0.2% by weight of said composition.
8. The composition of claim 3 containing in addition an effective amount of an additive selected from the group consisting of barium salts of hydrocarbyl sulfonates, calcium salts of hydrocarbyl sulfonates, sodium salts of hydrocarbyl sulfonates, calcium phenates, and mixtures thereof.
9. An anti-corrosion composition for hydrocarbon oils consisting essentially of:
   (a) a hydrocarbyl sulfonate salt of a metal selected from Groups IIb and IVa of the Periodic Table; and
   (b) a non-ionic surfactant selected from the group consisting of polyvinyl alcohols and polyvinyl pyrrolidone, where in the weight ratio of the sulfonate salt to the non-ionic surfactant is from about 0.5:1 to about 100:1.
10. The composition of claim 9 wherein the metal salt of the hydrocarbyl sulfonate is selected from the group consisting of basic lead salts of hydrocarbyl sulfonates, basic zinc salts of hydrocarbyl sulfonates, lead salts of hydrocarbyl sulfonates wherein all of the valences of the lead are satisfied by hydrocarbyl sulfonate groups, zinc salts of hydrocarbyl sulfonates wherein both valences of the zinc are satisfied by hydrocarbyl sulfonate groups, and mixtures thereof.
11. The composition of claim 10 wherein the metal salt of the hydrocarbyl sulfonate contains about 18 to about 65 carbons per hydrocarbyl sulfonate group.
12. The composition of claim 10 wherein the metal salt of the hydrocarbyl sulfonate is selected from the group consisting of lead di (nonylnaphthalene sulfonate), zinc di (nonylnaphthalene sulfonate), lead di (octadecylbenzene sulfonate), monobasic lead nonylnaphthalene sulfonate, monobasic zinc nonylnaphthalene sulfonate, zinc di (octadecylbenzene sulfonate), lead di (eicosyl sulfonate) and zinc di (eicosyl sulfonate).

References Cited
UNITED STATES PATENTS

| 2,398,193 | 4/1946 | Sharp | 252—33.4 |
| 2,485,150 | 10/1949 | Glavis et al. | 252—52 |
| 2,587,545 | 2/1952 | Sproule et al. | 252—56 |
| 2,681,315 | 6/1954 | Longberg et al. | 252—33.4 |
| 2,693,448 | 11/1954 | Landis et al. | 252—33.4 |
| 2,763,613 | 9/1956 | Scott et al. | 252—33.4 |
| 2,788,326 | 4/1957 | Bondi et al. | 252—33.4 |
| 2,850,455 | 9/1958 | Kern et al. | 252—33.4 |

DANIEL E. WYMAN, Primary Examiner

I. VAUGHN, Assistant Examiner

U.S. Cl. X.R.

252—51.5A, 52R, 74, 75, 389R